US012228214B2

(12) United States Patent
Surve et al.

(10) Patent No.: US 12,228,214 B2
(45) Date of Patent: Feb. 18, 2025

(54) NINE PORT COOLING VALVE

(71) Applicants: Shubhada Surve, Itasca, IL (US); James Pearson, Itasca, IL (US)

(72) Inventors: Shubhada Surve, Itasca, IL (US); James Pearson, Itasca, IL (US)

(73) Assignee: Robertshaw Controls Company, Itasca, IL (US)

(*) Notice: Subject to any disclaimer, the term of this patent is extended or adjusted under 35 U.S.C. 154(b) by 313 days.

(21) Appl. No.: 17/686,641

(22) Filed: Mar. 4, 2022

(65) Prior Publication Data
US 2022/0316607 A1 Oct. 6, 2022

Related U.S. Application Data

(60) Provisional application No. 63/169,558, filed on Apr. 1, 2021.

(51) Int. Cl.
F16K 11/08 (2006.01)
F16K 11/085 (2006.01)
F16K 27/06 (2006.01)

(52) U.S. Cl.
CPC ........ F16K 11/0856 (2013.01); F16K 27/065 (2013.01)

(58) Field of Classification Search
CPC ............................ F16K 27/065; F16K 11/0856
See application file for complete search history.

(56) References Cited

U.S. PATENT DOCUMENTS

| 3,090,396 | A | * | 5/1963 | Rudelick | F16K 11/0856 251/324 |
| 3,636,981 | A | * | 1/1972 | Henry | F16K 11/0856 137/625.46 |
| 4,345,622 | A | * | 8/1982 | Henningsson | F16K 11/00 137/637.1 |
| 4,445,540 | A | * | 5/1984 | Baron | F16L 45/00 137/625.43 |
| 4,574,840 | A | * | 3/1986 | Schumann | F16K 11/0856 137/625.46 |
| 5,152,321 | A | * | 10/1992 | Drager | F16K 11/0856 137/625.29 |
| 10,543,148 | B1 | * | 1/2020 | Collins | A61H 33/6057 |
| 2008/0029168 | A1 | * | 2/2008 | Kinlaw | F16K 11/0856 137/597 |
| 2013/0074961 | A1 | * | 3/2013 | Hong | F16K 27/065 137/597 |
| 2015/0260298 | A1 | * | 9/2015 | Poggel | F16K 11/02 137/625 |
| 2016/0243743 | A1 | * | 8/2016 | Hanson | B29C 48/255 |
| 2017/0254425 | A1 | * | 9/2017 | Takamatsu | F16K 37/005 |
| 2018/0372235 | A1 | * | 12/2018 | Smith | F16K 11/0853 |
| 2020/0049263 | A1 | * | 2/2020 | Ozeki | F16K 5/04 |

* cited by examiner

Primary Examiner — Kevin R Barss
(74) Attorney, Agent, or Firm — Miller & Martin PLLC

(57) ABSTRACT

A multiport valve has a stemshell rotatable within a valve body with two columns of ports arranged in a planar array. An extra port extends external to the array and inlet ports communicate with selected outlet ports. The stemshell has lateral channels and longitudinal channels which cooperate with the ports at selected angular positions to provide desired inlet/outlet flows while preventing intermixing within the valve.

20 Claims, 8 Drawing Sheets

NINE PORT COOLING VALVE

CLAIM OF PRIORITY

This application claims the benefit of U.S. Provisional Patent Application No. 63/169,558 filed Apr. 1, 2021, which is incorporated herein by reference in its entirety.

FIELD OF THE INVENTION

The present invention relates to valves, and more particularly to multiport valves having lateral and longitudinal flow paths internal to as stem shell based on flow position, and more particular to a nine-port cooling valve having multiple, such as four, different flow configurations.

BACKGROUND OF THE INVENTION

An eight-port valve was designed for a customer having a 2×4 array of ports with a stemshell internal to the valve configured to provide specific flow paths for specific positions of the stemshell. However, another port was needed for a new use outside of the 2×4 array of ports, and a new flow path requirement was deemed to be necessary. The eight-port valve has a stemshell oriented with a rotational axis parallel to the 2 port axis (a width direction) and perpendicular to the 4 port axis (a length direction) whereby the length is longer than the width.

Accordingly, an improved multi-port valve construction was deemed to be needed in the industry.

A need exists for a port outside of an array for uses in the industry.

Another need exists for an ability to modify a valve design to accommodate another port outside of an array of ports.

SUMMARY OF THE INVENTION

It is an object of many embodiments of the present invention to provide an improved valve, such as a cooling valve, having multiple inlet/outlet ports.

It is another object of many embodiments of the present invention to provide an improved cooling valve having a port outside of an array of ports, and possibly outside of a parallel and planar array of ports, while still parallel to the array of ports.

It is another object of many embodiments of the present invention to provide at least one port outside of a row of an array of parallel disposed ports.

It is still another object of many embodiments of the present invention to provide a valve having a stemshell which rotates about an axis in a length direction which is longer than a width direction.

Improvements to valves are believed to benefit various industries. Some coolant valves and other valves can benefit by re-orienting the axis of rotation of the stemshell to be along a longer lengthwise direction than a shorter width direction. This may be particularly beneficial when providing flow to and from an array of ports such as having at least two rows and at least three columns, such as four columns. In addition to an array, many embodiments of the present invention provide at least one external to the array, but preferably planar with the other ports. For at least some embodiments, this extra port outside of the array can provide a flow path at least for some of the flow configurations of the valve which would not be possible with the array of ports.

For instance, for a 2×4 array of planarly disposed ports, an extra port may be added to be coplanar with the array, but outside of the array. One possibility is to provide the extra port on what would be another row, if it completed the array, which it does not since it is only one space of what would require 4 to become a 3×4 array. The extra port for the preferred embodiment is colinear with a column of the ports for at least some embodiments but need not necessarily be so for all embodiments. Furthermore, the extra port(s) need not be coplanar with the array of ports for all embodiments.

For many embodiments, the extra port does not have flow for all flow configurations, but instead selectively provides for input and/or output flow under certain conditions (while presumably another port in the array may have flow secured therethrough).

BRIEF DESCRIPTION OF THE DRAWINGS

The particular features and advantages of the inventions with other objects will become apparent from the following description taken in connection with the accompanying drawings in which.

DETAILED DESCRIPTION OF THE PREFERRED EMBODIMENT

Figure 1:
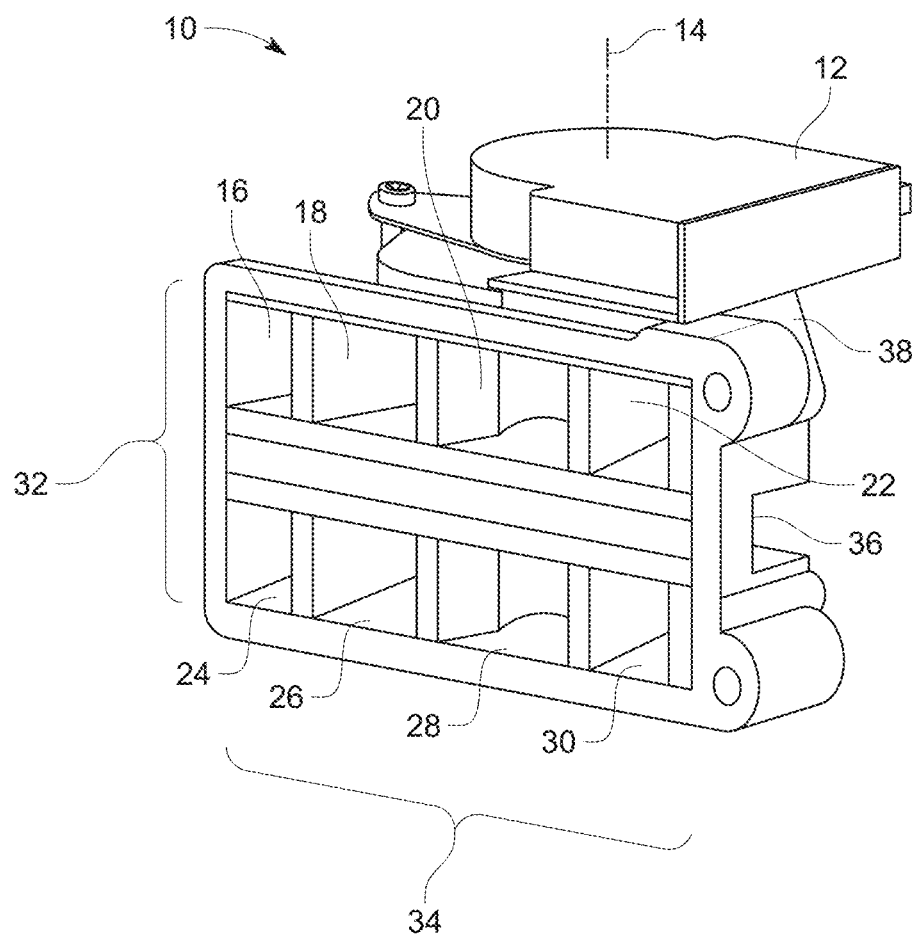
FIG. 1 is a front perspective view of an eight port valve.
Figure 2:
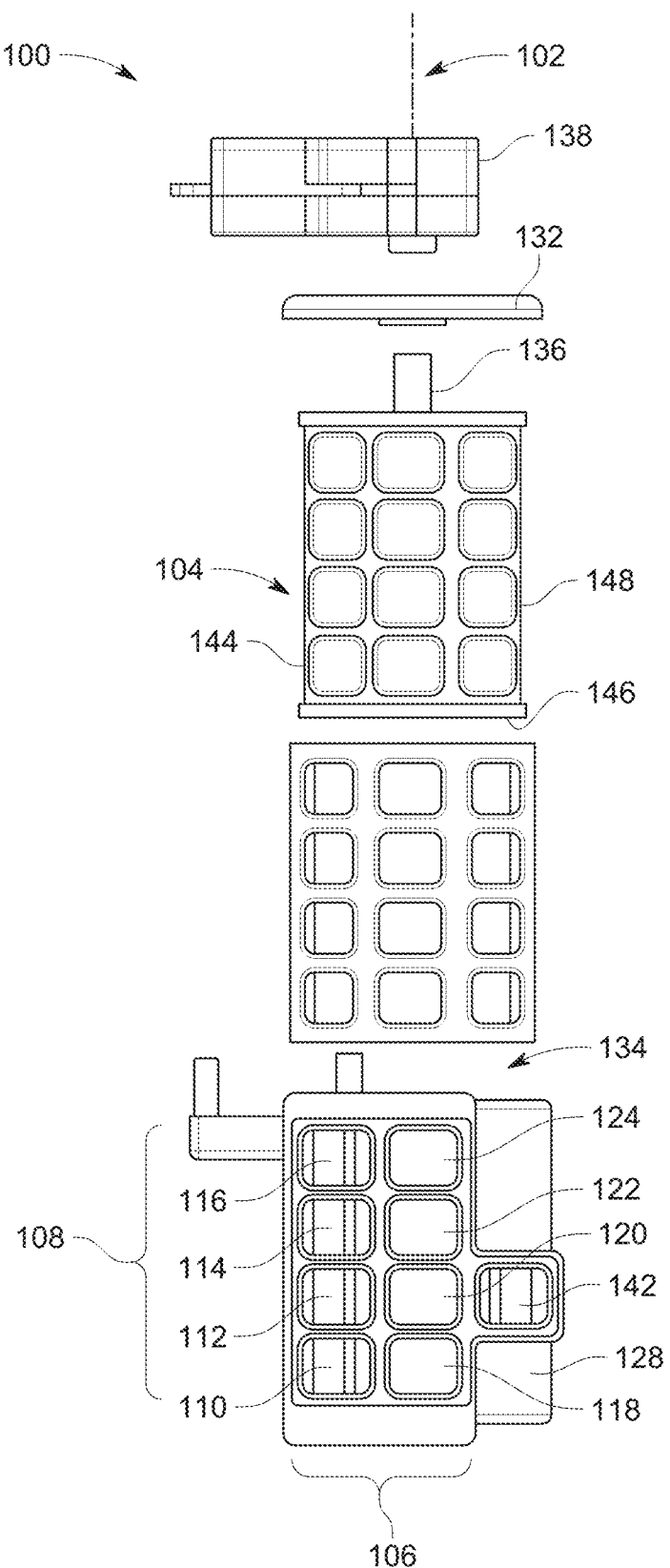
FIG. 2 is an exploded view of a nine port valve of a presently preferred embodiment of the present invention.
Figure 3:
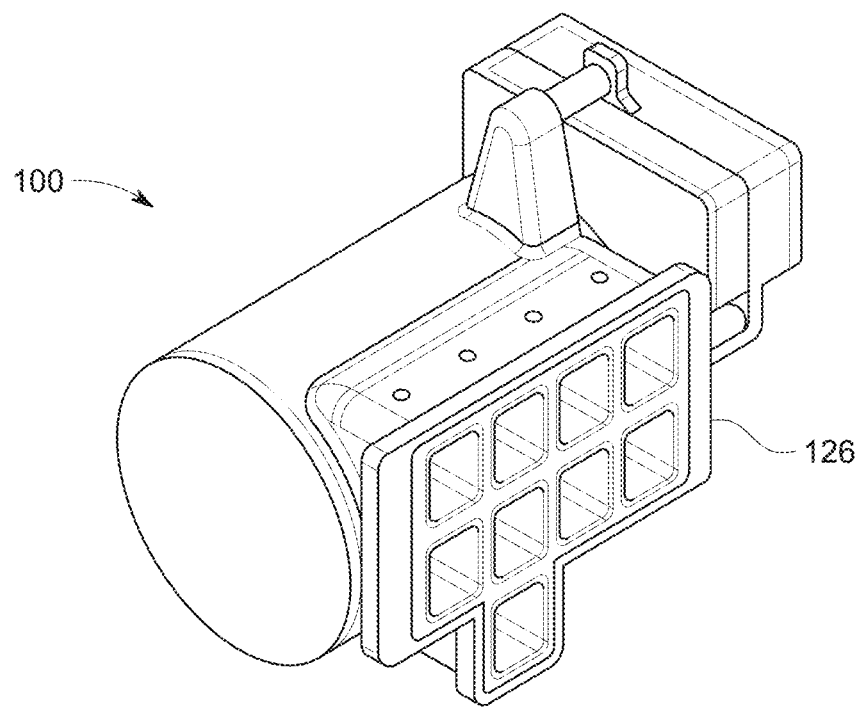
FIG. 3 is a side perspective view of the presently preferred embodiment of the valve of FIG. 2.
Figure 4:
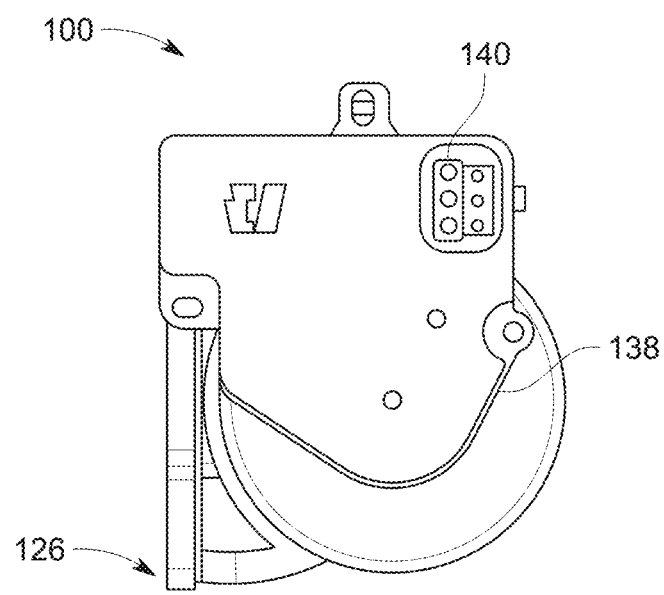
FIG. 4 is a side plan view of the presently preferred embodiment of the valve of FIGS. 2-3.
Figure 5:
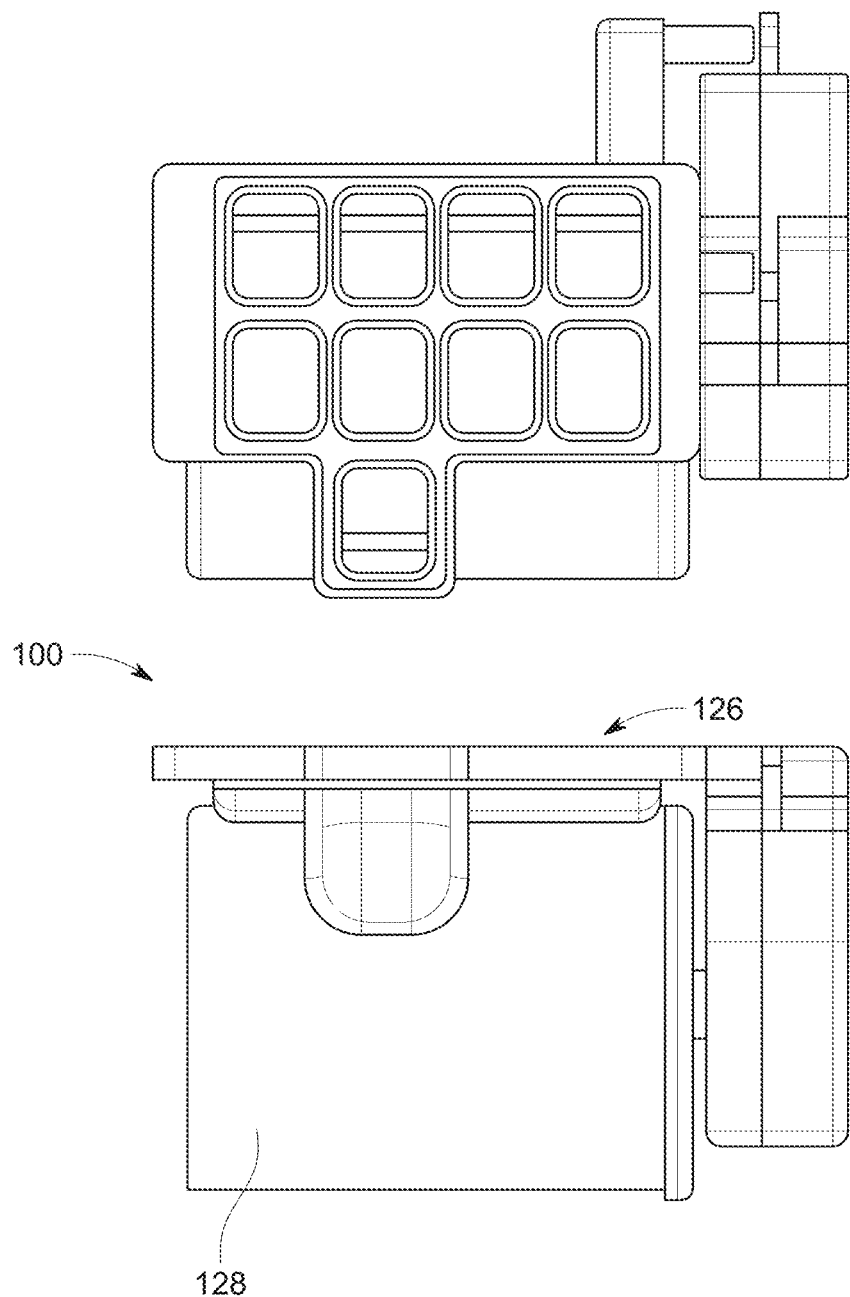
FIG. 5 is a front plan view of the valve of the valve of FIGS. 2-4.

FIG. 1 is an eight port valve 10. This valve 10 has an actuator 12 driving a stemshell (not shown) along rotation axis 14. The valve 10 has eight inlet/outlet ports 16,18,20, 22,24,26,28,30. The ports 16-30 provide a 2×4 array with two rows of four columns of the ports 16-30 with the rows and columns being linearly disposed relative to each other as would be expected for an array: the first row has ports 16-22, the second row has ports 24-30. The two rows comprise width 32 and the four stations comprise length 34. The rotation axis 14 is parallel to the width 32. The actuator 12 can receive a signal to rotate to provide specific flow patterns through at least some of the ports 16-30 depending on the rotational position of the stemshell (obscured from view) about the rotational axis 14. Due to the geometries involved, the plate 36 with the ports 16-30 has an area extending well beyond the area of the stemshell, and the housing 38 about the stemshell such as by roughly a factor of 2 as can be seen with reference to FIG. 1.

While the eight port valve 10 of FIG. 1 can be useful for many situations, improvements can be had for other uses. Specifically, FIGS. 2-9 provide a nine port valve 100 which has a different operational rotational axis 102 than the eight port valve 10. Specifically, spindle or stemshell 104 rotates about rotational axis 102. The valve 100 can have an array of linear rows and linear columns such as could be similar or dissimilar to valve 10 along a width 106 and length 108.

Instead of the rotational axis 102 being parallel to the width 106 like the eight port valve 10, the rotational axis 102 is parallel to the length 108 for the illustrated embodiment. The length 108 is greater than the width 106. The length 108 has four stations while the width has two rows of input/output ports 110,112,114,116,118,120,122,124. The input/output ports 110-124 may be located along a planar plate 126, possibly somewhat similarly to the plate 36 of the eight port valve 10. One of ordinary skill in the art will quickly see that by orienting the rotational axis 102 of the stemshell 104 lengthwise rather than widthwise, different flow options may be accommodated with valve body 128.

The valve 100 may have a seal 130 to assist in sealing the stemshell 104 relative to the valve body 128. A cover 132 may assist in sealing an end 134 of the valve body 128 while directing a rotator 136 to an actuator 138. The actuator 138 may receive positional instructions from various sources, such as a processor, not shown providing instructions through communications port 140, a pin connector or other port 140.

The valve 100 also has a ninth port 142 which is located outside of the array of ports 110-124 of the length 108 and width 106. In the preferred embodiment the extra port 142 is oriented in a plane with plate 126, but outside of the array, such as in a row by itself although linearly disposed with ports 112 and 120. Extra port 142 may be included in plate 126 for some embodiments. Still other embodiments may orient the extra port 142 outside of the plane of a port 110-124, such as at an angle thereto while being adjacent to at least some of the ports 110-124 or otherwise disposed.

Figure 6:
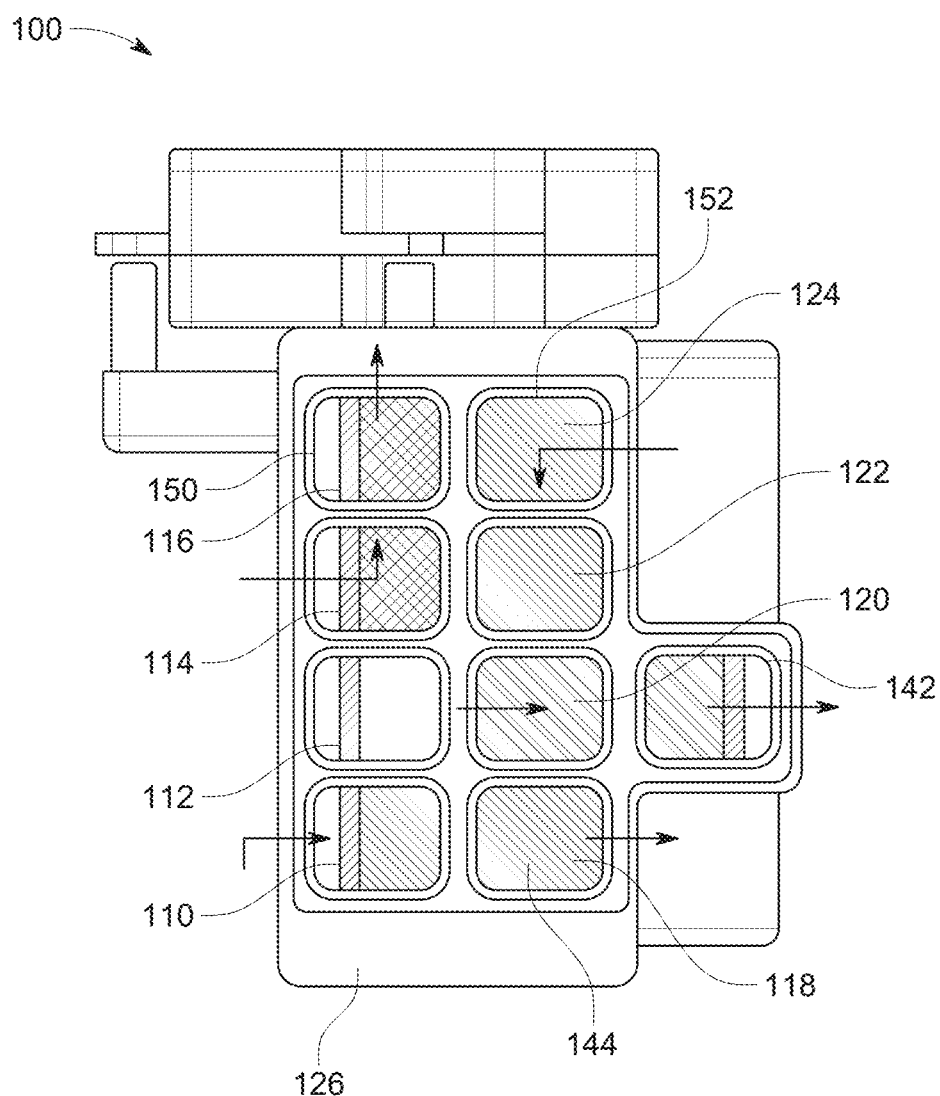
FIG. 6 is a top plan view of the valve of FIGS. 2-5 showing a first flow configuration.

As shown in FIGS. 6-9 various flow configurations can be provided through the various inlet/outlet ports 110-124 and 142. For instance, FIG. 6 shows a first flow configuration with flow from the sixth port 110 being directed to the fifth port 118 through a first lateral channel 144 extending into an exterior surface 146 of the stemshell 104. A second lateral channel 148 communicates an eighth port 120 with the seventh port 142. The ninth port 112 is not receiving or sending fluid in this flow configuration. A second port 114 sends fluid to a first port 116 along a first longitudinal channel 150 (oriented parallel to the rotation axis 102) extending into the exterior surface 146 of the stemshell 104. A second lateral channel 150 communicates the fourth port 124 with the third port 122.

Figure 7:
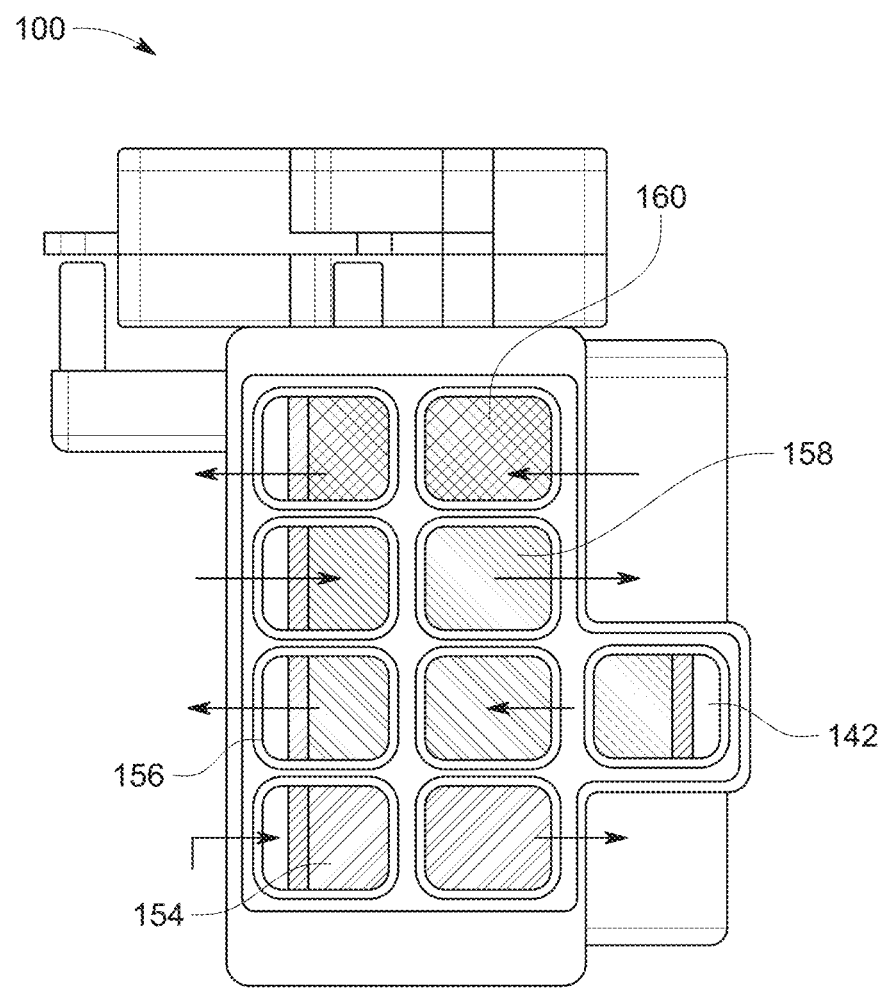
FIG. 7 is a top plan view of the valve of FIGS. 2-5 showing a second flow configuration.

The stemshell 104 of FIG. 7 has been rotated ninety degrees relative the first flow configuration of FIG. 6. A third lateral channel 154 communicates the sixth port 110 with the fifth port 118. A fourth lateral channel 156 communicates the eighth port 120 with the ninth port 112. A fifth lateral channel 158 communicates the second port 114 with the third port 122. And a sixth lateral channel 160 communicates the fourth port 125 with the first port 116. There is no flow through the seventh port 142 in this second flow configuration.

Figure 8:
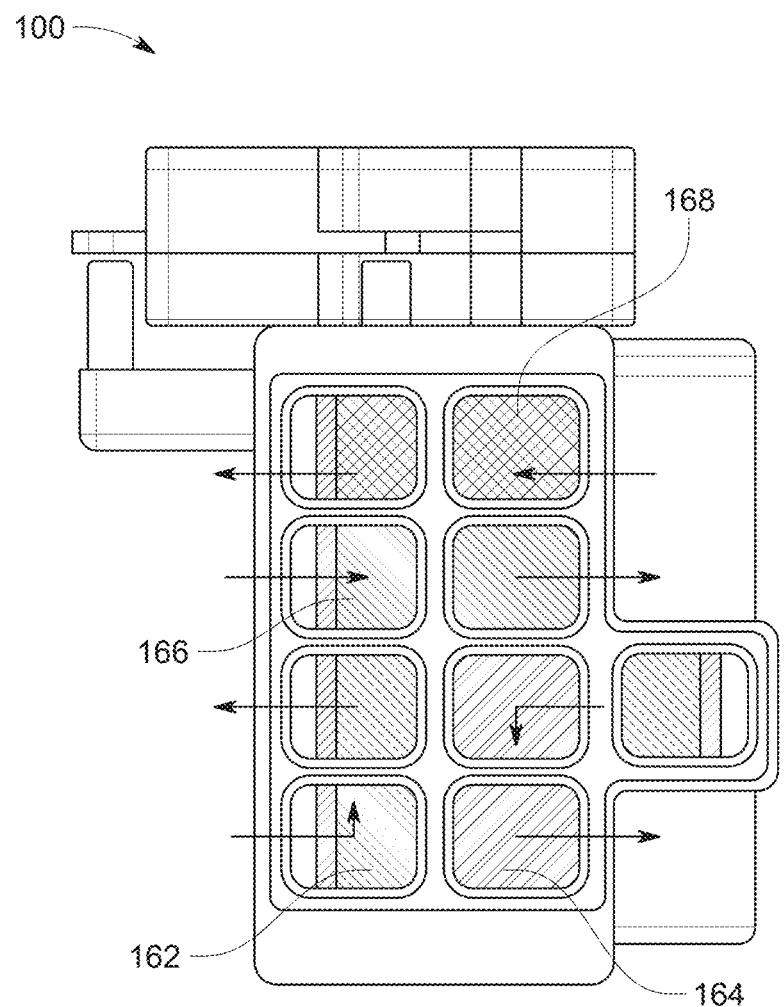
FIG. 8 is a top plan view of the valve of FIGS. 2-5 showing a third flow configuration.

Turning the stemshell 104 another ninety degrees to the second flow configuration (or 180 degrees to the first flow configuration) can achieve the third flow configuration of FIG. 8. Specifically, fluid may enter at sixth port 110 and exit through a third longitudinal channel 162 out ninth port 112. A fourth longitudinal channel 164 may direct flow from the eighth ort 120 to the fifth port 118. The seventh port may not have flow in or out in this configuration. Meanwhile, the second port 114 directs flow to the third port 122 through seventh lateral port 166 and the fourth port 124 directs flow to the first port 116 through eighth lateral port 168.

Figure 9:
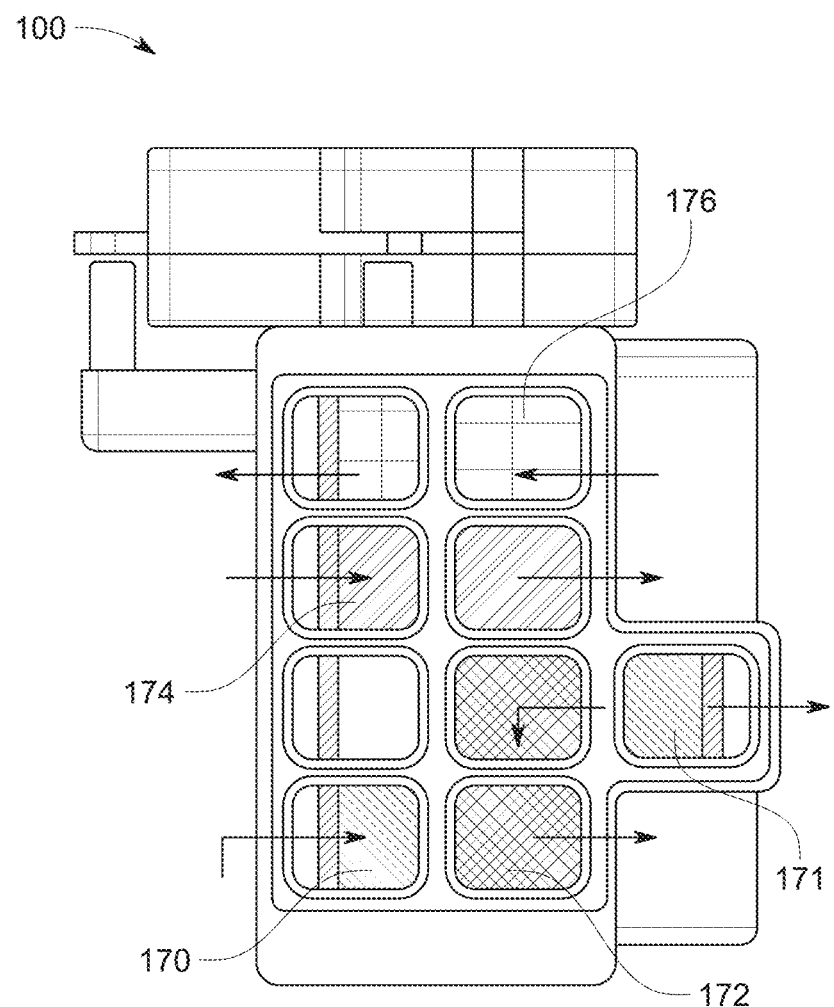
FIG. 9 is a top plan view of the valve of FIGS. 2-5 showing a fourth flow configuration.

FIG. 9 shows a fourth flow configuration, such as by continuing to rotate the stemshell 104 about the rotational axis 102 another ninety degrees from the third flow configuration (or two hundred seventy degrees from the first flow configuration). Flow may proceed into the sixth port 110 and through a first bore 170 in the stemshell 104 which communicates with a second bore 171 in the stemshell 104 and out the seventh port 142. The eight port 120 can communicate through fifth longitudinal channel 172 to direct flow out of fifth port 118. The ninth port 112 has no flow in this embodiment. The second port 114 sends fluid through the ninth lateral channel 174 to the third port 122. The fourth port 124 sends fluid through the tenth lateral channel 176 to the first port 116.

In the illustrated embodiment, the first, third, fifth ports 116, 122, 118 are always outlet ports and the second, fourth, sixth and eight ports 114, 124, 110 and 120 are always inlet ports. The ninth and seventh ports 112, 142 are always outlet ports when flow proceeds through them, but only one of the ninth and seventh port 112, 142 is open at a particular flow configuration.

Other embodiments may have other flow configurations at different rotational positions of a stemshell 104. Actuators 138 may control the positioning of the stemshell relative to rotational axis 102 so as to provide specific flow paths under certain conditions as directed by a processor or other device. Other embodiments may have other flow paths amongst the various inlet/outlet ports 110-124,142 under various situations. Still other embodiments may have other arrays other than 2×4 arrays with an extra port 142. The extra port 142 may be in addition to other arrays, such as 2×2, 2×3, 1×4, etc. By providing the extra port, particularly along a length 108, for many embodiments up to four different flow configurations can be achieved, or even more depending on the arrangement of channels, passages or bores about the stemshell 104. Additionally, while the extra port 142 is shown co-planar with the array of ports 110-124, it may be angled otherwise non-coplanar therewith for other embodiments. The housing 128 may assist in directing flow from the various flow paths dictated by the stemshell 104 in cooperation with the housing 128. For at least the illustrated embodiment, the housing 128 is substantially cylinder over at least half or two-thirds or more of its exterior shape with it then directing flow to the planar plate 126. With this construction, a particularly compact valve 100 can be provided to customers. The stemshell 104 of valve 100 is longer than with the construction of valve 10, and thus the plate 126 does not have an area that completely covers the cross section of the housing 127 as seen from above in FIGS. 6-9 which is different than the eight port valve 10 of FIG. 1.

By lateral channel, the applicant means that the channel into the exterior surface 146 of the stemshell 104 proceeds about a circumference of the stemshell 104 along an arc thereof. For the longitudinal channels, the channels proceed along the length (parallel to the rotation axis 102). While channels are useful for many embodiments of stemshells 104, passages, bores, or other flow paths through various portions of the stemshell 104 can achieve various flow paths at various rotational positions of the stemshell 104 about the rotation axis 102.

Numerous alterations of the structure herein disclosed will present themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having set forth the nature of the invention, what is claimed herein is:

1. A multi-port valve comprising:
   a valve body:
   a stemshell having an exterior surface and rotatable about a rotation axis extending through the valve body;
   at least a 2×2 planar array of adjacently disposed ports selectively communicating through the valve body depending upon the rotational position of the stemshell relative to the valve body:
   wherein rotation of the stemshell to at least a first rotational position selectively directs at least two inlet ports with two outlet ports of the at least the 2×2 planar array of ports.

2. The multi-port valve of claim 1 wherein the at least the 2×2 array of ports is a 2×4 array of ports.

3. The multi-port valve of claim 2 further comprising an actuator, said actuator rotating the stemshell relative to the valve body about the rotation axis.

4. The multi-port valve of claim 2 further comprising a seal intermediate the valve body and the stemshell, said seal having openings permitting flow through the ports.

5. A multi-port valve comprising:
   a valve body;
   a stemsbell having an exterior surface and rotatable about a rotation axis extending through the valve body:
   at least a 2×4 planar array of ports selectively communicating through the valve body depending upon the rotational position of the stemshell relative to the valve body:
   wherein rotation of the stemshell to at least a first rotational position selectively directs at least two inlet ports with two outlet ports of the at least the 2×2 planar array of ports;
   wherein an area of the 2×4 array is greater than a cross sectional area of the stemshell parallel to the 2×4 array.

6. The multi-port valve of claim 5 wherein an area of the 2×4 array is greater than a cross sectional area of the valve body parallel to the 2×4 array.

7. A multi-port valve comprising:
   a valve body:
   a stemshell having an exterior surface and rotatable about a rotation axis extending through the valve body:
   at least a 2×4 planar array of ports selectively co amunicating through the valve body depending upon the rotational position of the stemshell relative to the valve body:
   wherein rotation of the stemshell to at least a first rotational position selectively directs at least two inlet ports with two outlet ports of the at least the 2×2 planar array of porta;
   wherein the 2×4 array is two rows of four stations and the rotation axis is one of parallel and perpendicular to the rows.

8. A multi-port valve comprising:
   a valve body:
   a stemshell having an exterior surface and rotatable about a rotation axis extending through the valye body;
   at least a 2×4 planar array of ports selectively communicating through the valve body depending upon the rotational position of the stemshell relative to the valve body:
   wherein rotation of the stemshell to at least a first rotational position selectively directs at least two inlet ports with two outlet ports of the at least the 2×2 planar array of ports; and
   an extra port, said extra port outside of the array and one of (a) angled relative to the plane of the array and (b) in the plane of the array.

9. The multi-port valve of claim 8 wherein the array is two rows of stations and the rotation axis is one of parallel and perpendicular to the rows, and the extra port is linearly disposed with adjacent stations.

10. The multi-port valve of claim 9 wherein the 2×2 array of porta is a 2×4 array of ports identified as the first, second, third, fourth, fifth, sixth, seventh, and eighth ports, and with the stemshell in a first position relative to the valve body, the sixth port is in fluid communication with the fifth port through a first lateral channel in the exterior surface of the stemshell, the eighth port is in fluid communication with the seventh port through a second lateral channel in the exterior surface of the stemshell, the second port is in fluid communication with the first port through a first longitudinal channel in the exterior surface of the stemshell, and the fourth port is in fluid communication with the third port through a second longitudinal channel in the exterior surface of the stemshell, wherein the first and second longitudinal channels are parallel to the rotation axis and the first and second lateral channels are perpendicularly oriented relative to the rotation axis.

11. The multi-port valve of claim 10 wherein when in the first position, the extra port is not in fluid communication with the first, second, third, fourth, fifth, sixth, seventh or eighth ports.

12. The molti-port valve of claim 11 wherein with the stemshell in a second rotational position angularly displaced from the first position relative to the valve body. the sixth port is in fluid communication with the fifth port, the eighth port is in fluid communication with the extra port through a fourth lateral channel in the exterior surface of the stemshell, the second port is in fluid communication with the third port, and the fourth port is in fluid communication with the first port.

13. The multi-port valve of claim 12 wherein when in the second position, the seventh port is not in fluid communication with the first, second, third, fourth, fifth, sixth, seventh or eighth ports.

14. The multi-port valve of claim 13 wherein with the stemshell in a third rotational position angularly displaced from the first and second positions relative to the valve body, the sixth port is in fluid communication with the extra port, the eighth port is in fluid communication with the fifth port, the second port is in fluid communication with the third port, and the fourth port is in fluid communication with the first port.

15. The multi-port valve of claim 14 wherein when in the second position, the seventh port is not in fluid communication with the first, second, third. fourth, fifth. sixth, seventh or eighth ports.

16. The multi-port valve of claim 15 wherein with the stemshell in a fourth. rotational position angularly displaced from the first, second, and third positions relative to the valve body, the sixth port is in fluid communication with the seventh port, the eighth port is in fluid communication with the fifth port, the second port is in fluid communication with the third port, and the fourth port is in fluid communication with the first port.

17. The multi-port valve of claim 16 wherein when in the second position, the extra port is not in fluid communication with the first, second, third, fourth, fifth, sixth, seventh or eighth ports.

18. The multi-port valve of claim 17 wherein the stemshell further comprises third, fifth, sixth, seventh, eighth, ninth, and tenth lateral channels employed selectively in the second, third and fourth positions of the stemshell.

19. The multi-port valve of claim 18 wherein the stemshell further comprises third, fourth, and fifth longitudinal channels selectively employed in the second, third and fourth positions of the stemshell.

20. The multi-port valve of claim 10 wherein the first, third and fifth ports are outlet ports, the second, fourth, sixth and eight ports are inlet ports, and the seventh port and extra port are either outlet ports or secured in the first, second, third and fourth position of the stemshell.

\* \* \* \* \*

UNITED STATES PATENT AND TRADEMARK OFFICE
CERTIFICATE OF CORRECTION

| | | |
|---|---|---|
| PATENT NO. | : 12,228,214 B2 | Page 1 of 1 |
| APPLICATION NO. | : 17/686641 | |
| DATED | : February 18, 2025 | |
| INVENTOR(S) | : Shubhada Surve et al. | |

It is certified that error appears in the above-identified patent and that said Letters Patent is hereby corrected as shown below:

In the Claims

Claim 6, Column 5, Lines 44-45: "selectively co amuni-cating" should read --selectively communicating--

Claim 10, Column 6, Line 6: "of porta is a 2×4 array of ports identified as the first, second," should read --of ports is a 2×4 array of ports identified as the first, second,--

Claim 16, Column 6, Line 53: "stemshell in a fourth. rotational position angularly displaced" should read --stemshell in a fourth rotational position angularly displaced--

Signed and Sealed this
First Day of April, 2025

Coke Morgan Stewart
*Acting Director of the United States Patent and Trademark Office*